United States Patent [19]

Dussinger et al.

[11] Patent Number: 5,794,089
[45] Date of Patent: Aug. 11, 1998

[54] FILM ADVANCE MECHANISM FOR CAMERA

[75] Inventors: Thomas E. Dussinger, Henrietta; David C. Smart, Fairport, both of N.Y.

[73] Assignee: Eastman Kodak Company, Rochester, N.Y.

[21] Appl. No.: 832,147

[22] Filed: Apr. 2, 1997

[51] Int. Cl.[6] .................. G03B 17/04; G03B 1/00
[52] U.S. Cl. ................ 396/348; 396/401; 396/411
[58] Field of Search ........................... 396/348, 401, 396/411, 416, 433, 387

[56] References Cited

U.S. PATENT DOCUMENTS

| 2,659,283 | 11/1953 | Clifford et al. | 354/212 |
| 4,032,940 | 6/1977 | Chan | 354/288 |
| 4,104,664 | 8/1978 | Winkler et al. | 354/213 |
| 4,227,789 | 10/1980 | Driscoll et al. | 354/212 |
| 4,331,407 | 5/1982 | Winkler et al. | 354/212 |

Primary Examiner—Eddie C. Lee
Attorney, Agent, or Firm—Roger A. Fields

[57] ABSTRACT

A camera comprises a slide manually movable in a forward direction and in a reverse direction; a spool drive member adapted to be connected to a film spool for driving rotation in a winding direction to windingly rotate the film spool to wind an exposed film onto the film spool; and a two-way coupling between the slide and the spool drive member to drivingly rotate the spool drive member in the winding direction in order to windingly rotate the film spool when the slide is manually moved in the forward and reverse directions.

8 Claims, 5 Drawing Sheets 5,794,089

FILM ADVANCE MECHANISM FOR CAMERA

FIELD OF THE INVENTION

The invention relates generally to the field of photography, and in particular to a film advance mechanism for a camera.

BACKGROUND OF THE INVENTION

Prior art U.S. Pat. No. 4,104,664, issued Aug. 1, 1928 discloses a camera in which a slide that originally covers the housing of the camera is manually movable relative to the housing in a forward direction and in a reverse direction between a pulled-out extended position projecting from the housing, to uncover the housing, and pushed-in retracted position against the housing, to re-cover the housing. A take-up wheel in the housing is connectable to a film roll and, when connected, is drivingly rotated to wind successive exposed film frames onto the film roll following each exposure. A transmission and a one-way coupling are positioned between the slide and the take-up wheel to drivingly rotate the take-up wheel only when the slide is manually moved in the forward direction from the pushed-in position to the pulled-out position. Return of the slide in the reverse direction to its pushed-in position leaves the take-up wheel stationary.

As the exposed film frames are wound onto the film roll, the film roll incrementally increases in diameter. Consequently, the film roll will not have to be rotated as much to take up a single frame later as compared to when the film roll has only a few frames wound onto it. Since the take-up wheel is not drivingly rotated when the slide is returned to its pushed-in position, travel of the slide to its pulled-out position must be lengthy enough to wind a single frame onto the film roll when the film roll is substantially empty and its diameter is relatively small. This significantly adds to the size of the camera.

SUMMARY OF THE INVENTION

According to the invention, a camera comprises:

a slide manually movable in a forward direction and in a reverse direction;

a spool drive member adapted to be connected to a film spool for driving rotation in a winding direction to windingly rotate the film spool to wind an exposed film onto the film spool; and a two-way coupling between the slide and the spool drive member to drivingly rotate the spool drive member in the winding direction in order to windingly rotate the film spool when the slide is manually moved in the forward and reverse directions.

More specifically, the camera comprises:

a slide manually movable in a forward direction and in a reverse direction;

a film drive gear adapted to be coupled to a film spool for driving rotation in a winding direction to windingly rotate the film spool to wind an exposed film onto the film spool;

a pair of rotation pinions each one of which is independently movable into engagement with the film drive gear to drivingly rotate the film drive gear in the winding direction and is independently movable out of engagement with the film drive gear; and respective racks fixed to the slide to engage the individual pinions to move one of the pinions out of engagement with the film drive gear and move the other pinion into engagement with the film drive gear, and rotate the other pinion to drivingly rotate the film drive gear, when the slide is manually moved in the forward direction, and to move the other pinion out of engagement with the film drive gear and move the one pinion into engagement with the film drive gear, and rotate the one pinion to drivingly rotate the film drive gear, when the slide is manually moved in the reverse direction.

Since the slide is effective to windingly rotate the film spool to wind an exposed film onto the film spool when the slide is moved in the reverse directions well as in the forward direction, its travel in either direction is reduced. This allows the size of the camera to be reduced.

DETAILED DESCRIPTION OF THE INVENTION

Figure 1:
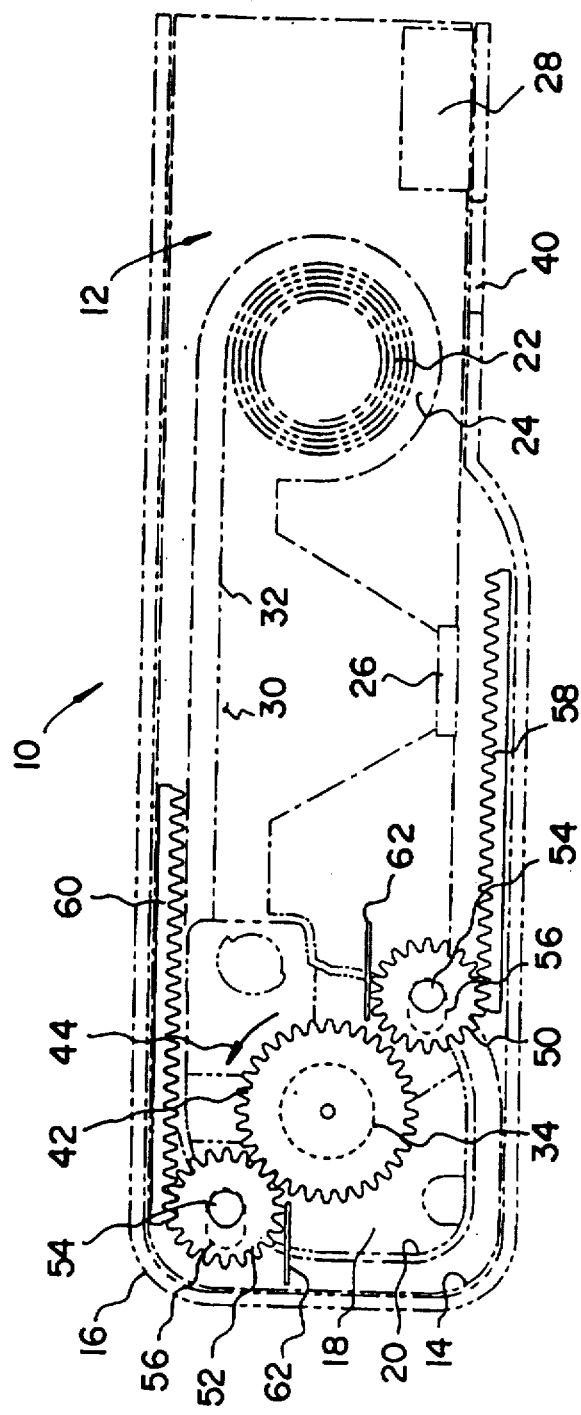
FIGS. 1–4 are top sectional views of a one-time-use camera with a film advance mechanism which is a preferred embodiment of the invention, showing the film advance mechanism in various stages of operation.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Background

Film and cameras that are all in one, commonly referred to as single-use or one-time-use cameras, have become well known. Typically, the known one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket, a manually rotatable film advance thumbwheel rotatably engaged with a film spool inside the film cartridge, a single-blade shutter, a manually depressible shutter release button, a frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the known one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

The Preferred Embodiment

Referring now to the drawings, FIGS. 1–4 show a one-time-use camera 10 that has a film advancing mechanism which is different than in the typical camera. The camera generally comprises an interior main body part 12, a housing 14 for the main body part, and a cover slide 16.

The main body part 12 supports a known film cartridge 18 in a cartridge chamber 20, an unexposed film roll 22 in a film roll chamber 24, a taking lens 26 and an electronic flash 28. After each exposure at a backframe opening 30 between the film cartridge 18 and the unexposed film roll 22, one frame increment of a filmstrip 32 forming the unexposed film roll, though having one end connected to a film spool 34 within the film cartridge 18, is wound onto the film spool when the spool is windingly rotated.

Figure 2:
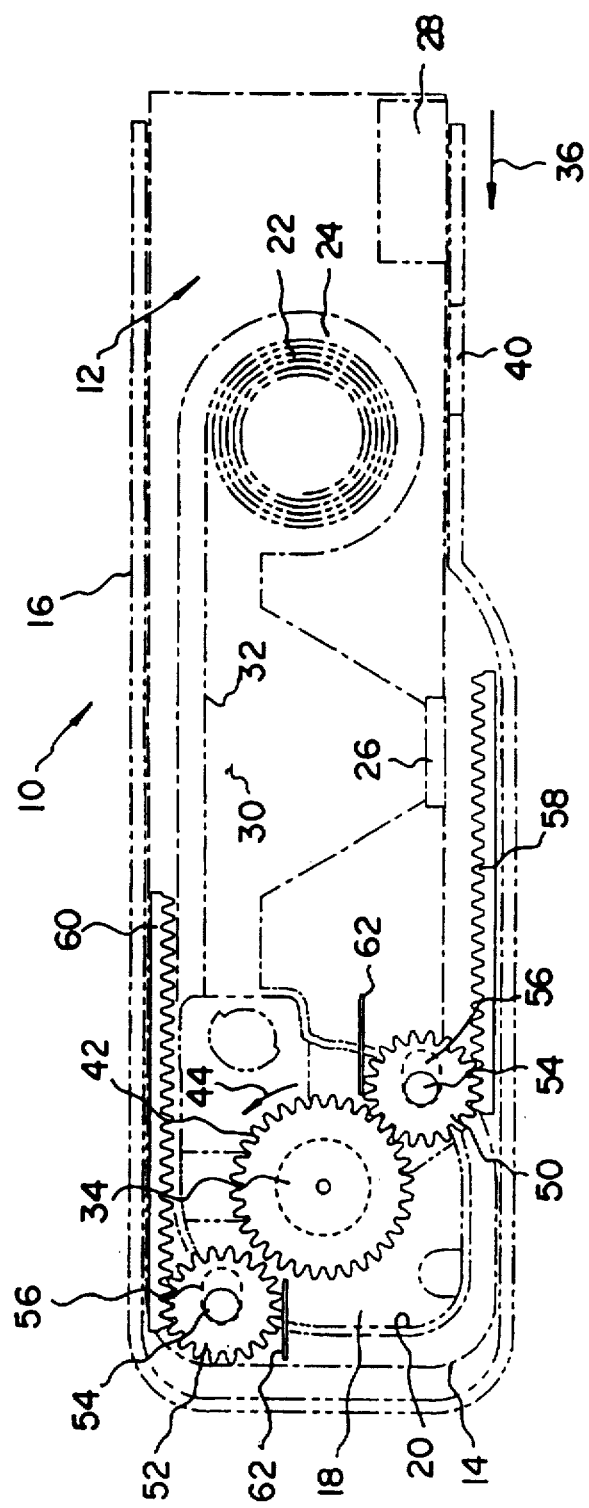
Figure 3:
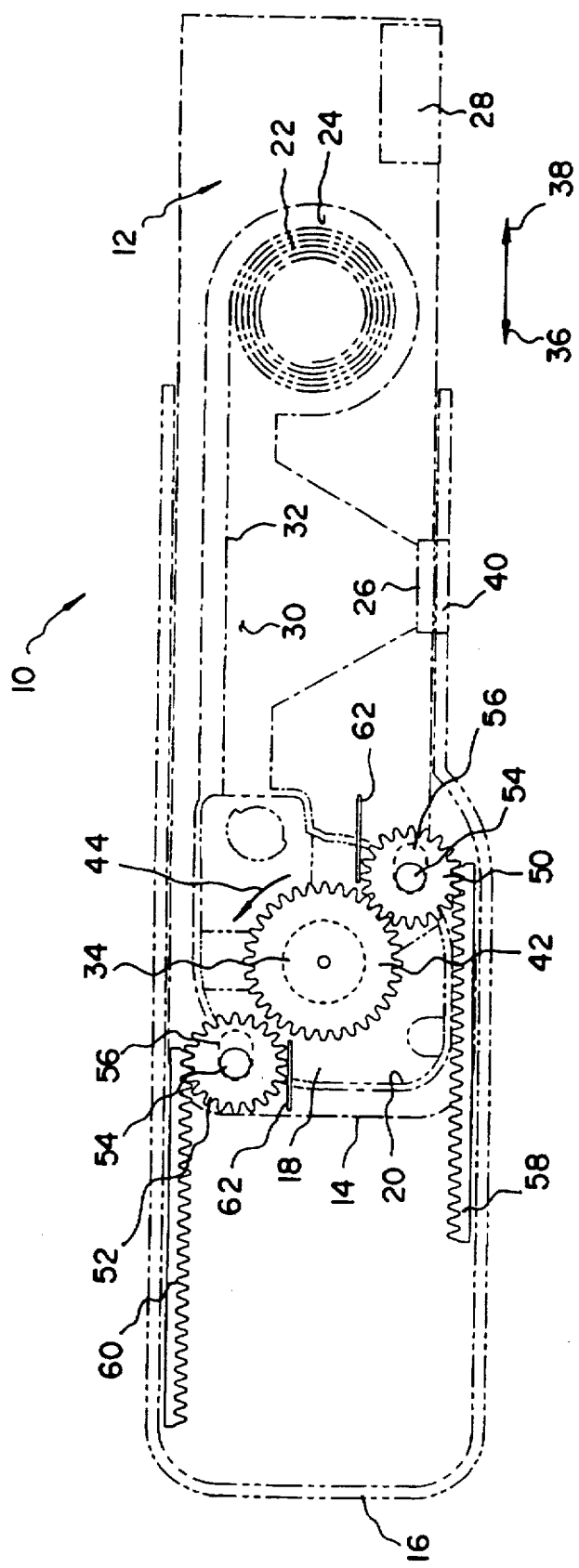
Figure 4:
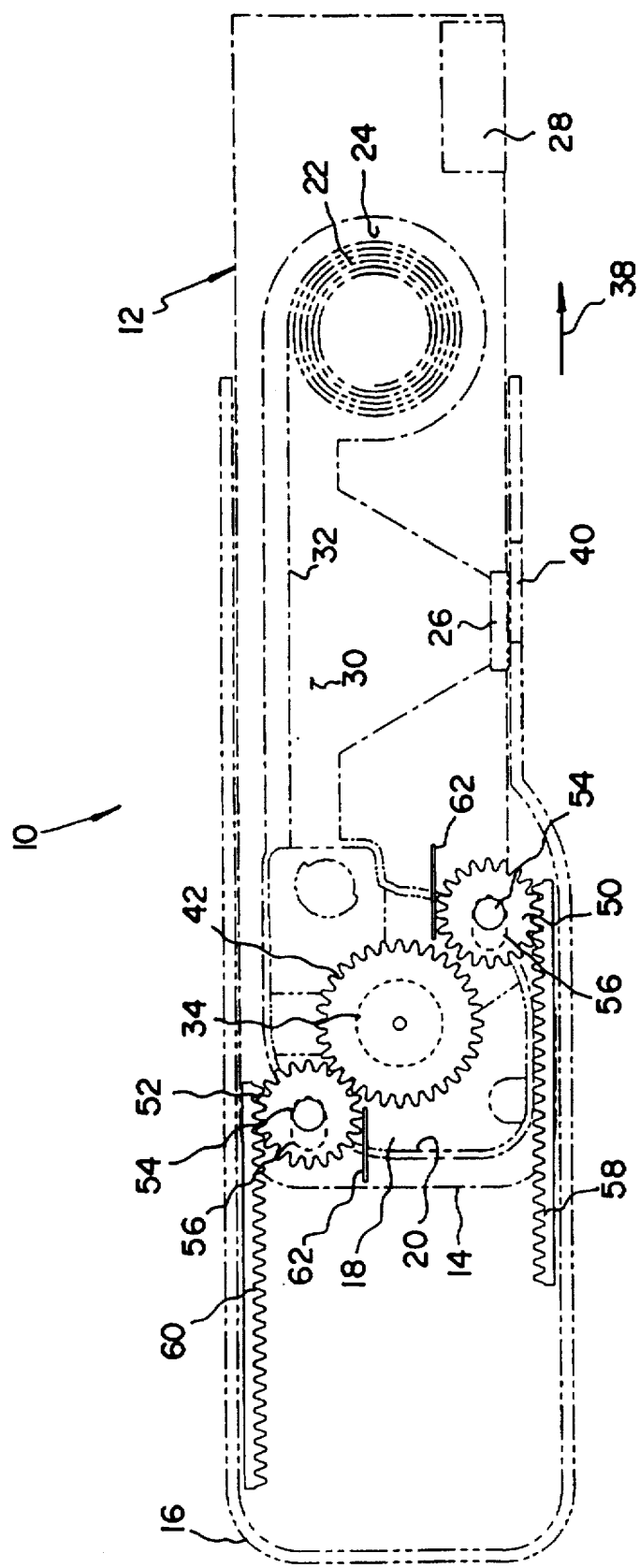
Figure 5:
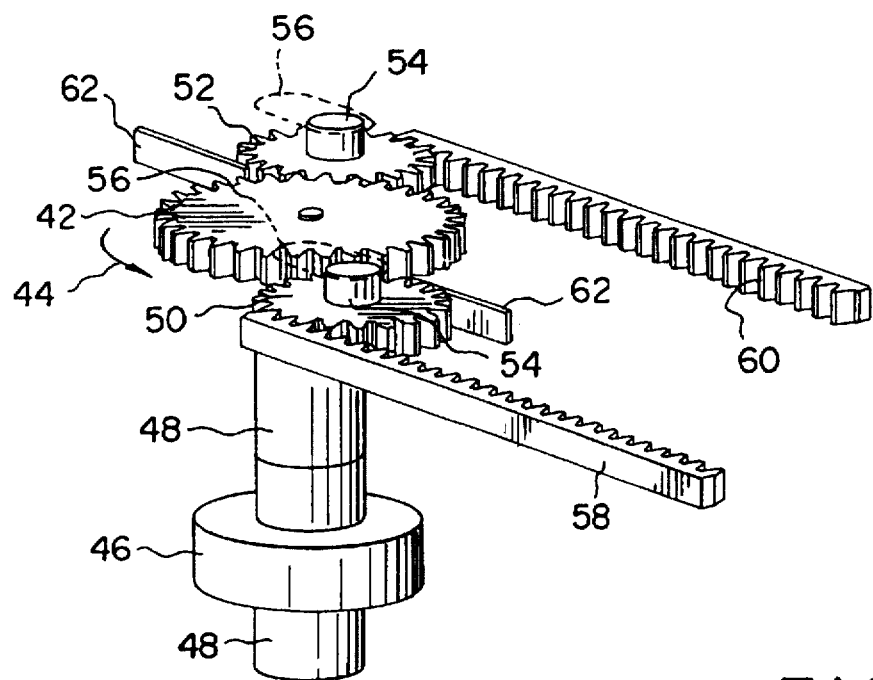
FIG. 5 is perspective view of the film advance mechanism.
Figure 5:
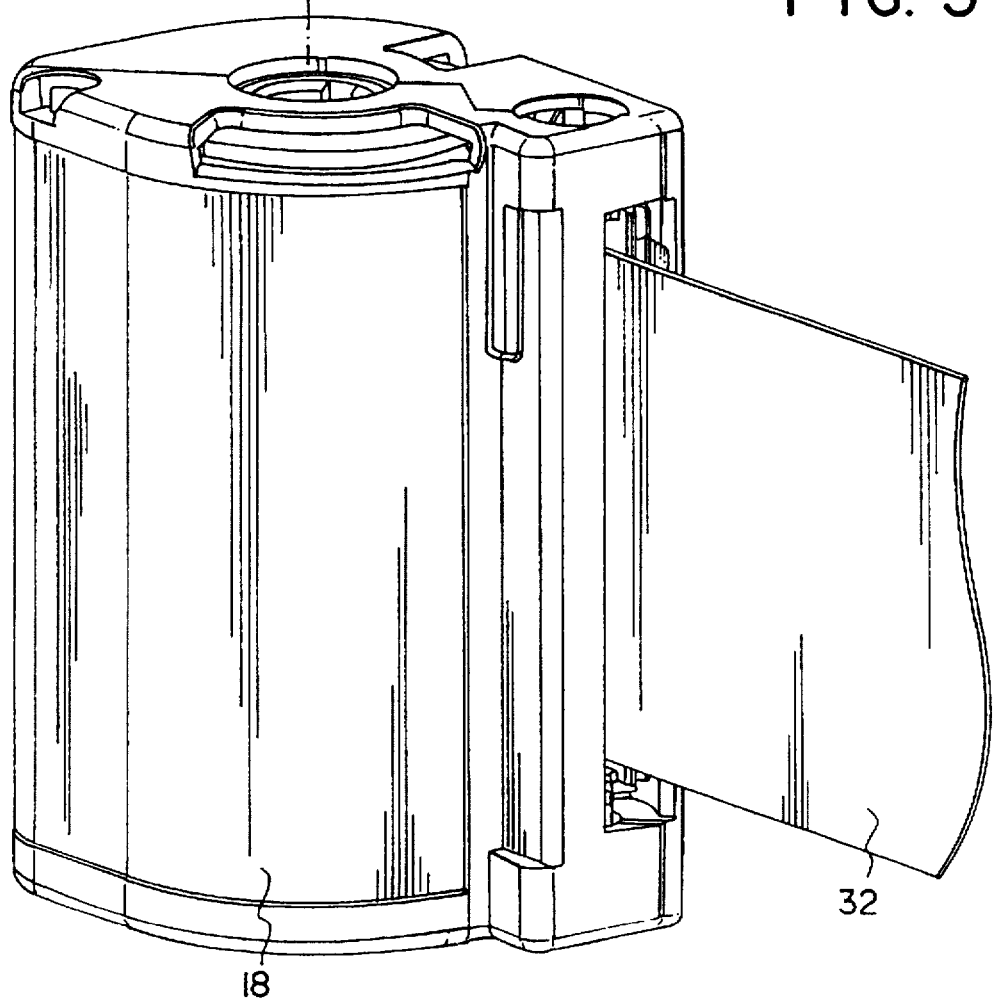

The cover slide 16 originally covers the housing 14, including the taking lens 26 and the electronic flash 28, and is manually movable relative to the housing in forward and reverse directions 36 and 38, shown in FIGS. 2 and 4, between a pulled-out extended position projecting from the housing, to uncover the taking lens and the electronic flash unit, and a pushed-in retracted position against the housing, to re-cover the taking lens and the electronic flash. FIG. 3 shows the cover slide 16 in its pulled-out position, removed from in front of the electronic flash 28 and with a lens opening 40 in the cover slide aligned with the taking lens 26. FIG. 1 shows the cover slide 16 in its pushed-in position, re-covering the electronic flash 28 and the taking lens 26.

A film drive gear 42, shown in FIGS. 1–5, is coaxially connectable with the film spool 34 of the film cartridge 18 for driving rotation in a winding direction 44 to windingly rotate the film spool in order to wind one frame increment of the filmstrip 32 onto the spool after each exposure. A known one-way slip clutch 46 is coaxially interposed between depending stem portions 48 of the film drive gear 42 to prevent driving rotation of the film drive gear in the winding direction 44 from windingly rotating the film spool 34 when the filmstrip 32 is arrestingly engaged by a known metering device, such as a metering sprocket or a metering pawl, not shown.

A pair of rotation pinions 50 and 52 are independently translatable, proximate opposite sides of the film drive gear 42, into engagement with the film drive gear to drivingly rotate the film drive gear in the winding direction 44 and are independently translatable out of engagement with the film drive gear. When one of the pinions 50 and 52 engages the film drive gear 42, the other pinion is removed from the film drive gear. As shown in FIGS. 2 and 4, the individual pinions 50 and 52 have respective coaxial pins 54, fixed to the individual pinions, which are rotatable in separate slots 56 in the main body part 12 to rotate the individual pinions and are movable along the fixed slots to translate the individual pinions.

Respective racks 58 and 60 are fixed to the cover slide 16 to engage the individual pinions 50 and 52 to translate one of the pinions out of engagement with the film drive gear 42 and translate the other pinion into engagement with the film drive gear, and rotate the other pinion to drivingly rotate the film drive gear, when the cover slide is manually moved in the forward direction 36 from its pushed-in position, and to move the other pinion out of engagement with the film drive gear and move the one pinion into engagement with the film drive gear, and rotate the one pinion to drivingly rotate the film drive gear, when the cover slide is manually moved in the reverse direction 38 from its pulled-out position. Respective reed springs 62 press against the peripheries of the individual pinions 50 and 52 to assure that the pinions will be translated.

Operation

Beginning with FIG. 4, after each exposure the cover slide 16 is manually moved in the reverse direction 38 from its pulled-out position in FIG. 3 to make the rack 60 translate the pinion 52 into engagement with the film drive gear 42 and to make the rack 58 translate the pinion 50 out of engagement with the film drive gear. Then, continued movement of the cover slide 16 in the reverse direction 38 to its pushed-in position in FIG. 1 makes the rack 60 rotate the pinion 52 to drivingly rotate the film drive gear 42 in the winding direction 44, to windingly rotate the film spool 34 in order to wind approximately one-half of a frame increment of the filmstrip 32 onto the spool. The rack 58 drivingly rotates the pinion 50 without any affect on the film drive gear 42, since that pinion is removed from the film drive gear.

As shown in FIG. 2, the cover slide 16 is manually moved in the forward direction 36 from its pushed-in position in FIG. 1 to make the rack 58 translate the pinion 50 into engagement with the film drive gear 42 and to make the rack 60 translate the pinion 52 out of engagement with the film drive gear. Then continued movement of the cover slide 16 in the forward direction 36 to its pulled-out position in FIG. 3 rotates the pinion 50 to drivingly rotate the film drive gear 42 in the winding direction 44, to windingly rotate the film spool 34 in order to wind the remaining-half frame increment of the filmstrip 32 onto the spool. The rack 60 drivingly rotates the pinion 52 without any affect on the film drive gear 42, since that pinion is removed from the film drive gear.

The slip clutch 46 prevents driving rotation of the film drive gear 42 in the winding direction 44 from windingly rotating the film spool 34 when the filmstrip 32 is arrestingly engaged by the metering device. This application of the slip clutch 46 to allow rotation of the film drive gear 42 without rotating the film spool 34 takes place shortly before the cover slide 16 has reached the pulled-out position, to permit the cover slide to be finally moved to the pulled-out position. The exact point, during movement of the cover slide toward its pulled-out position, at which the filmstrip 32 is arrestingly engaged by the metering device, slightly varies in accordance with the number of film convolutions wound onto the film spool 34.

The invention has been described with reference to a preferred embodiment. However, it will be appreciated that variations and modifications can be effected by a person of ordinary skill in the art without departing from the scope of the invention. For example, the cover slide 16 need simply be a manual side part that does not further serve as a substantial cover for the housing 14.

Parts List 10. camera
12. main body part
14. housing
16. cover slide
18. film cartridge
20. cartridge chamber
22. unexposed film roll
24. film roll chamber
26. taking lens
28. electronic flash
30. backframe opening
32. filmstrip
34. film spool
36. forward direction
38. reverse direction
40. lens opening
42. film drive gear
44. winding direction
46. slip clutch
48, 48. depending stem portions
50. rotation pinion
52. rotation pinion
54, 54. pins
56, 56. slots
58. rack
60. rack
62, 62. reed springs

What is claimed is:

1. A camera comprising:

a slide manually movable in a forward direction and in a reverse direction;

a spool drive member adapted to be connected to a film spool for driving rotation in a winding direction to windingly rotate the film spool to wind an exposed film onto the film spool; and a two-way coupling between said slide and said spool drive member to drivingly rotate the spool drive member in the winding direction in order to windingly rotate the film spool when the slide is manually moved in the forward and reverse directions.

2. A camera as recited in claim 1, wherein said slide covers said spool drive member when the slide is manually moved in the forward and reverse directions.

3. A camera comprising:

a slide manually movable in a forward direction and in a reverse direction;

a film drive gear adapted to be coupled to a film spool for driving rotation in a winding direction to windingly rotate the film spool to wind an exposed film onto the film spool;

a pair of rotation pinions each one of which is independently movable into engagement with said film drive gear to drivingly rotate the film drive gear in the winding direction and is independently movable out of engagement with the film drive gear; and respective racks fixed to said slide to engage said individual pinions to move one of the pinions out of engagement with said film drive gear and move the other pinion into engagement with the film drive gear, and rotate the other pinion to drivingly rotate the film drive gear, when the slide is manually moved in the forward direction, and to move the other pinion out of engagement with the film drive gear and move the one pinion into engagement with the film drive gear, and rotate the one pinion to drivingly rotate the film drive gear, when the slide is manually moved in the reverse direction.

4. A camera as recited in claim 3, wherein said slide originally covers a housing and is movable relative to said housing in the forward and reverse directions between a pulled-out position projecting from the housing to at least partially uncover the housing and a pushed-in position against the housing to re-cover the housing.

5. A camera as recited in claim 3, wherein said individual pinions are supported proximate opposite sides of said film drive gear for translation to move the one pinion out of engagement with said film drive gear and move the other pinion into engagement with the drive gear when said slide is manually moved in the forward direction and to move the other pinion out of engagement with the film drive gear and move the one pinion into engagement with the drive gear when the slide is manually moved in the reverse direction.

6. A camera as recited in claim 5, wherein said individual pinions have respective coaxial pins that are rotatable in separate fixed slots to rotate the individual pinions and are movable along said fixed slots to translate the individual pinions.

7. A camera as recited in claim 6, wherein respective springs press against peripheries of said individual pinions at locations that facilitate translation of the pinions.

8. A one-time-use camera comprising:

a main body part containing a filmstrip formed in a film roll and a separate film cartridge having a film spool rotatable in a winding direction to wind the filmstrip incrementally onto said film spool after each exposure;

a cover slide for at least partially covering said main body part and being manually movable in a forward direction and in a reverse direction;

a film drive gear coupled to said film spool for unidirectional driving rotation to rotate the film spool in the winding direction;

a pair of rotation pinions each one of which is alternately movable into and out of engagement with said film drive gear, one at a time, to unidirectionally drivingly rotate the film drive gear to rotate said film spool in the winding direction when engaged with the film drive gear; and respective racks fixed to said cover slide to continuously engage said individual pinions to move one of the pinions out of engagement with said film drive gear and move the other pinion into engagement with the film drive gear, and unidrectionally drivingly rotate the other pinion when the slide is manually moved in the forward direction, and to move the other pinion out of engagement with the film drive gear and move the one pinion into engagement with the film drive gear, and unidrectionally drivingly rotate the one pinion when the slide is manually moved in the reverse direction.

* * * * *